United States Patent [19]

Thompson et al.

[11] Patent Number: 5,333,161

[45] Date of Patent: Jul. 26, 1994

[54] INTERGRANULAR STRESS CORROSION CRACKING MITIGATION BY RAPID QUENCH MELTING

[75] Inventors: Robert A. Thompson, Quaker Street; Marshall G. Jones, Scotia, both of N.Y.

[73] Assignee: General Electric Company, Schenectady, N.Y.

[21] Appl. No.: 35,098

[22] Filed: Mar. 19, 1993

[51] Int. Cl.$^5$ .................. G21C 21/00; C21D 6/00
[52] U.S. Cl. .................... 376/305; 148/512; 148/DIG. 93
[58] Field of Search ............ 376/305; 148/224, 512, 148/525, DIG. 93; 219/121.6, 121.65, 121.66; 422/7, 24

[56] References Cited

U.S. PATENT DOCUMENTS

| | | | |
|---|---|---|---|
| 4,239,556 | 12/1980 | Cline et al. | 148/512 |
| 4,398,966 | 8/1983 | Kelly et al. | 148/512 |
| 5,022,936 | 6/1991 | Tsujimura et al. | 148/525 |

Primary Examiner—Daniel D. Wasil
Attorney, Agent, or Firm—Paul R. Webb, II

[57] ABSTRACT

This invention relates to a method to selectively mitigate intergranular stress corrosion cracking (IGSCC) by rapid quench melting through the use of a pulsed laser. Such methods of the type, generally, mitigate reactor pipe cracking by rapidly melting the sensitized material to redissolve chromium carbide and then rapidly cooling the sensitized material such that corrosion cracking can be avoided.

5 Claims, 4 Drawing Sheets

INTERGRANULAR STRESS CORROSION CRACKING MITIGATION BY RAPID QUENCH MELTING

BACKGROUND OF THE INVENTION

1. Field of the Invention

This invention relates to a method to selectively mitigate intergranular stress corrosion cracking (IGSCC) by rapid quench melting through the use of a pulsed laser. Such methods of the type, generally, mitigate reactor pipe cracking by rapidly melting the sensitized material to redissolve chromium carbide and then rapidly cooling the sensitized material such that corrosion cracking can be avoided.

2. Description of the Related Art

It is known, that during operation of boiling water reactors (B.W.R.) that steam bypass lines may develop intergranular stress corrosion cracking (IGSCC). The IGSCC can adversely affect the structural integrity of the steam bypass lines and cause the boiling water reactor to be shut down. Three elements are critical to the formation of IGSCC. They are:
(1) Residual Stress
(2) Sensitization
(3) Reactor Chemistry.

Reactor chemistry is generally fixed so that there are only two viable solutions to the IGSCC problem. Of these, although they can be reduced by optimized welding procedures, residual tensile stresses in the weld near field are unavoidable. Consequently, there is extreme need for a suitable method to mitigate the interdiameter surface of reactor pipes where IGSCC starts. Therefore, a reduction in the amount of IGSCC is critical.

It is apparent from the above that there exists a need in the art for an IGSCC mitigation method which is capable of mitigating cracks which form in reactor pipes and other reactor components. It is a purpose of this invention to fulfill this and other needs in the art in a manner more apparent to the skilled artisan once given the following disclosure.

SUMMARY OF THE INVENTION

Generally speaking, this invention fulfills these needs by providing a method for preventing intergranular stress corrosion cracking in a substrate employing an apparatus comprising a pulsed laser, comprising the steps of: holding said substrate; surface treating a predetermined portion of said substrate with said pulsed laser such that substantially any intergranular stress corrosion cracking is prevented; and repeating, if necessary, said surface treatment step until a predetermined amount of said substrate has been surface treated.

In certain preferred embodiments, the pulsed laser is a neodymium-glass laser system operating at 50 joules per pulse. Also the surface to be treated was located approximately 41 millimeters from the pulsed laser. Finally, the pretreatment step consists of pulse time of 10 milliseconds, a heat effect time of 150 milliseconds, a melt zone of approximately 50 mils in diameter by up to 60 mils deep, and a recast time of approximately 30 milliseconds.

In another preferred embodiment, IGSCC is mitigated by rapid quench melting using a pulsed laser.

The preferred IGSCC mitigation system, according to this invention, offers the following advantages: rapid melting; rapid solidification; excellent crack mitigation characteristics; good stability; good durability; good economy; and high strength for safety. In fact, in many of the preferred embodiments, the factors of rapid melting, rapid solidification, and crack mitigation are optimized to an extent that is considerably higher than heretofore achieved in prior, known crack mitigation techniques.

BRIEF DESCRIPTION OF THE DRAWINGS

The above and other features of the present invention which will be more apparent as the description proceeds are best understood by considering the following detailed description in conjunction with the accompanying drawings wherein like character represent like parts throughout the several views and in which.

DETAILED DESCRIPTION OF THE INVENTION

Figure 1:
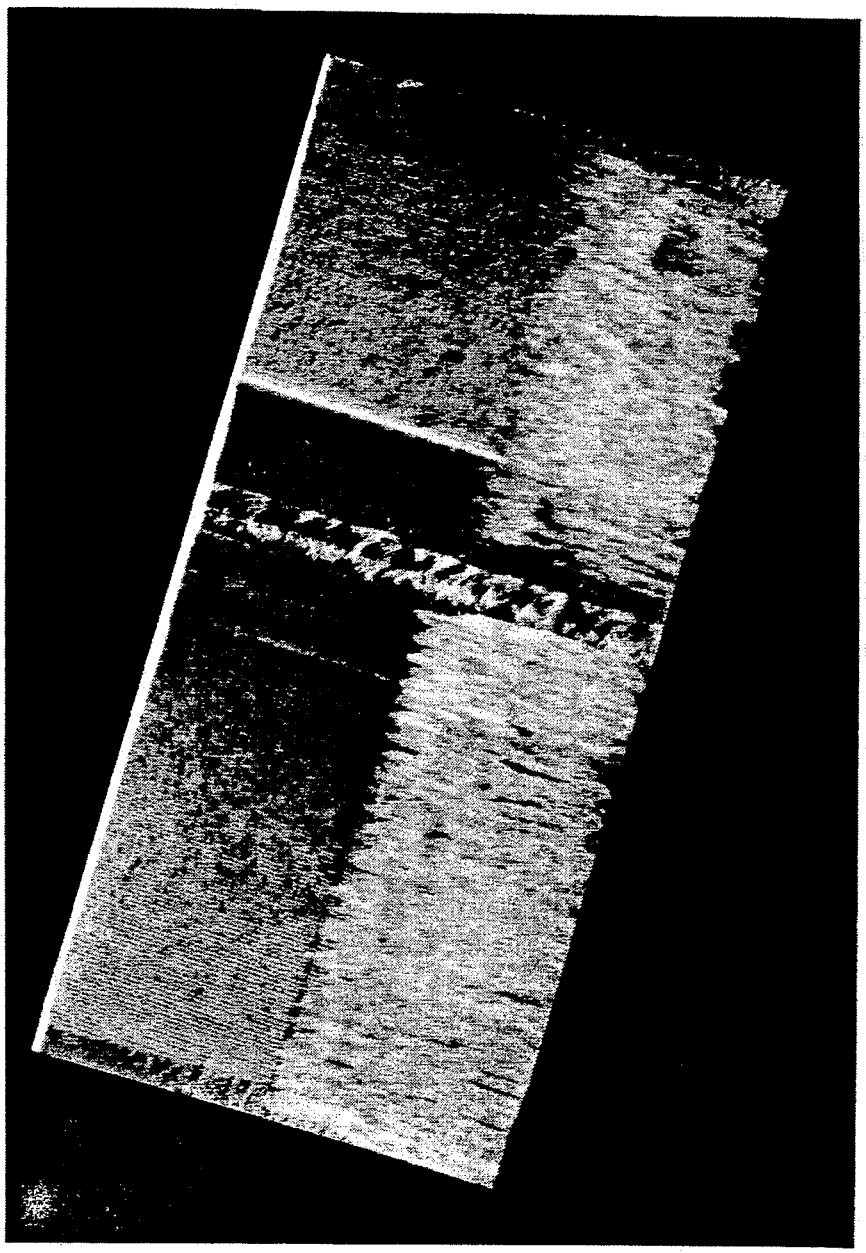
FIG. 1 is a photographic illustration of the substrate prior to the surface treatment.

In an attempt to mitigate material in and around the weld region of a sample, preferably, of 304 Stainless Steel, the surface of the region was melted with a pulse laser to a depth of 45–55 mils. A ¾" by 1¼" area was treated which included a welded region, a weld prep region and a destructively ground region.

The surface treatment was accomplished, preferably, by melting 50-mil diameter spots with a 50% overlapping pattern and up to 60 mils deep. The pulse time, preferably, was approximately 10 milliseconds. The heat effect time, preferably, was approximately 150 milliseconds. The recast time, preferably, was approximately 30 milliseconds. The pattern, preferably, consisted of 1500 diameters whose centers were located at the points of a square array. All points were, preferably, equally spaced 25 mils apart.

The above described pattern was generated with a 1.06 micrometer wavelength neodymium-glass pulse laser system operating at 50 joules per pulse. The optics consisted of a 46 mm convex lens. The surface to be treated was located 41 millimeters from the lens for proper energy densities for laser welding. This defocused condition minimized surface vaporization and maximized material melting.

Since full recast and cooldown require only about 0.1 second, there is virtually no chance for any sensitization during the melt cycle, the time required for sensitization being in excess of 10 seconds. Consequently, the pulse laser approach is a potential solution to the mitigation process. With regard to the number of pulses to anneal 1 square inch of surface, if a 50% overlap of the 50-mil melted spots is assumed, then 40, 25-mil steps in each direction would be needed, making a total of 1600 pulses per square inch of treatment which would require 8 seconds. Under these conditions, about 3 hours would be required to mitigate a butt weld in a 26" diameter reactor pipe.

It is to be understood that the operating parameters of the mitigation system are of vital importance to the present invention. This is because the pulse time and heat effect time are relatively short as to not adversely affect the material characteristics of the material that surrounds the melt zone. Also, the melt zone is relatively small such that the melt gas can be rapidly heated and cooled. Finally, the recast time is relatively short so that chromium carbides are redissolved into the recast material and cannot easily dissolve out of the recast material, thereby causing IGSCC because of chromium-depleted grain boundary regions.

Figure 2:
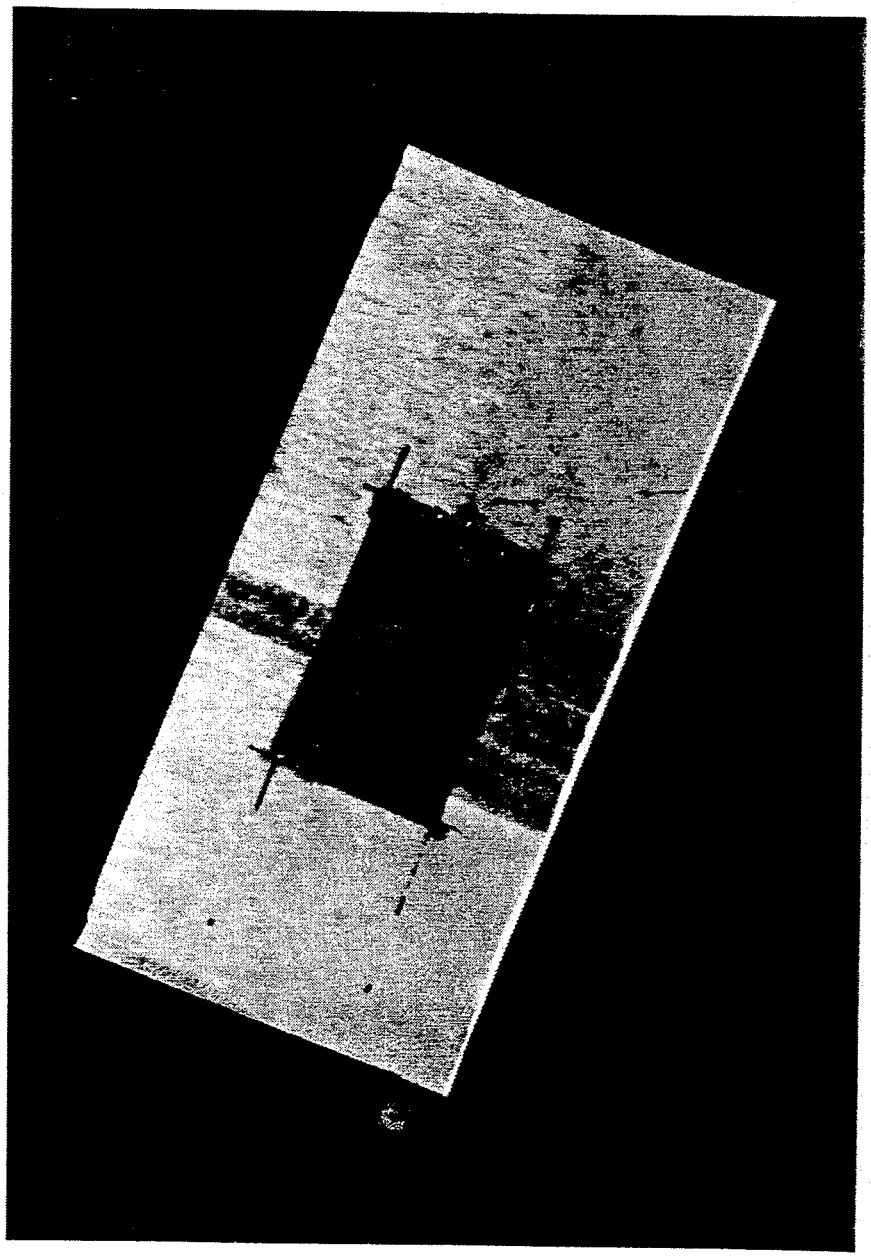
FIG. 2 is a photographic illustration of the substrate after surface treatment, according to the present invention.

As discussed earlier FIG. 1 is a photographic illustration of the sample of 304 Stainless Steel prior to the surface treatment. As shown in FIG. 2, bubbling and some pitting did occur on four rows at one end of the treated region. This also happened on part of the first row at the other end of the treated zone. It was due to an improper lens focus and an unshielded air stream which was used to control the plume during lasing for lens protection.

Figure 3:
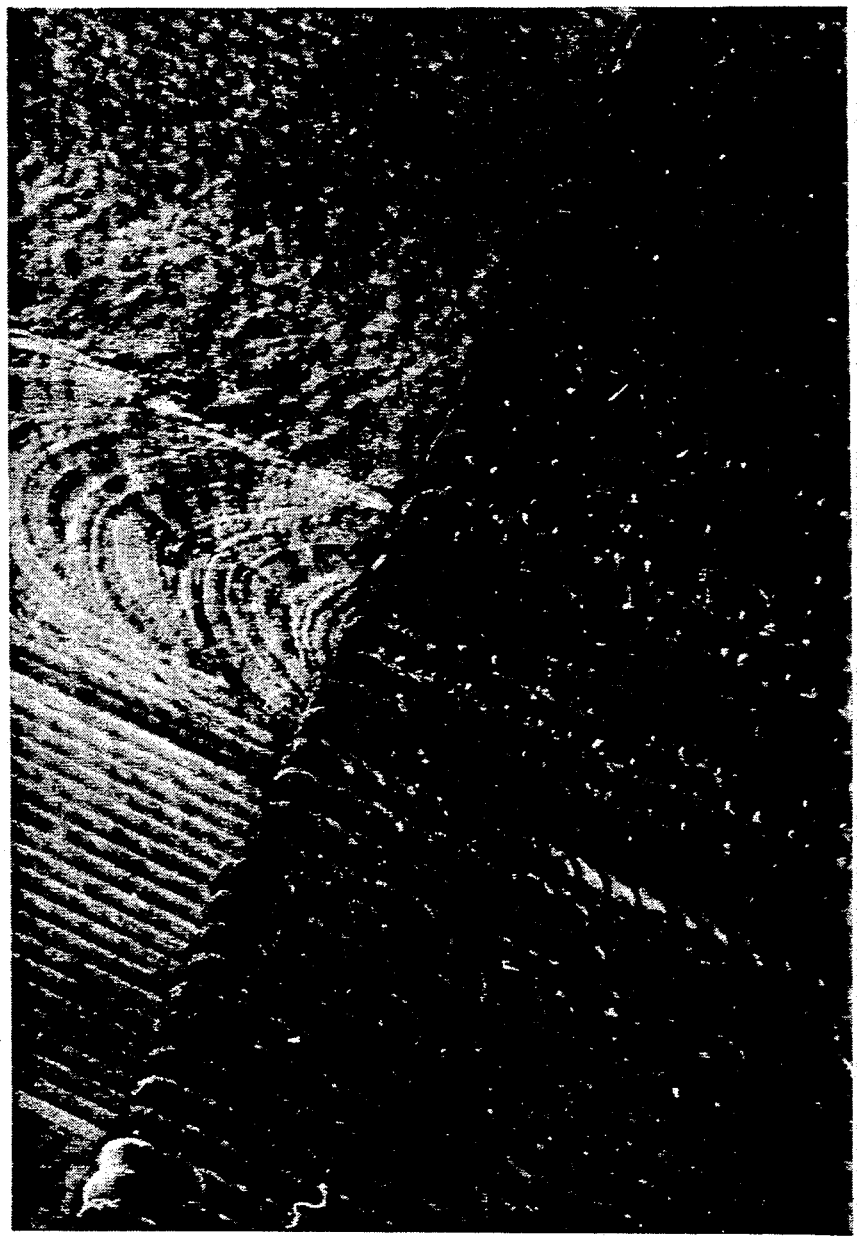
FIG. 3 is a photographic illustration of a close up (10×) of the surface treatment.

FIG. 3 shows a close up of the surface treatment of the as-machine butt weld zone. As can be seen in FIG. 3 the 50% overlapping pattern can be observed. This overlapping pattern substantially reduces the likelihood of IGSCC occurring.

Figure 4:
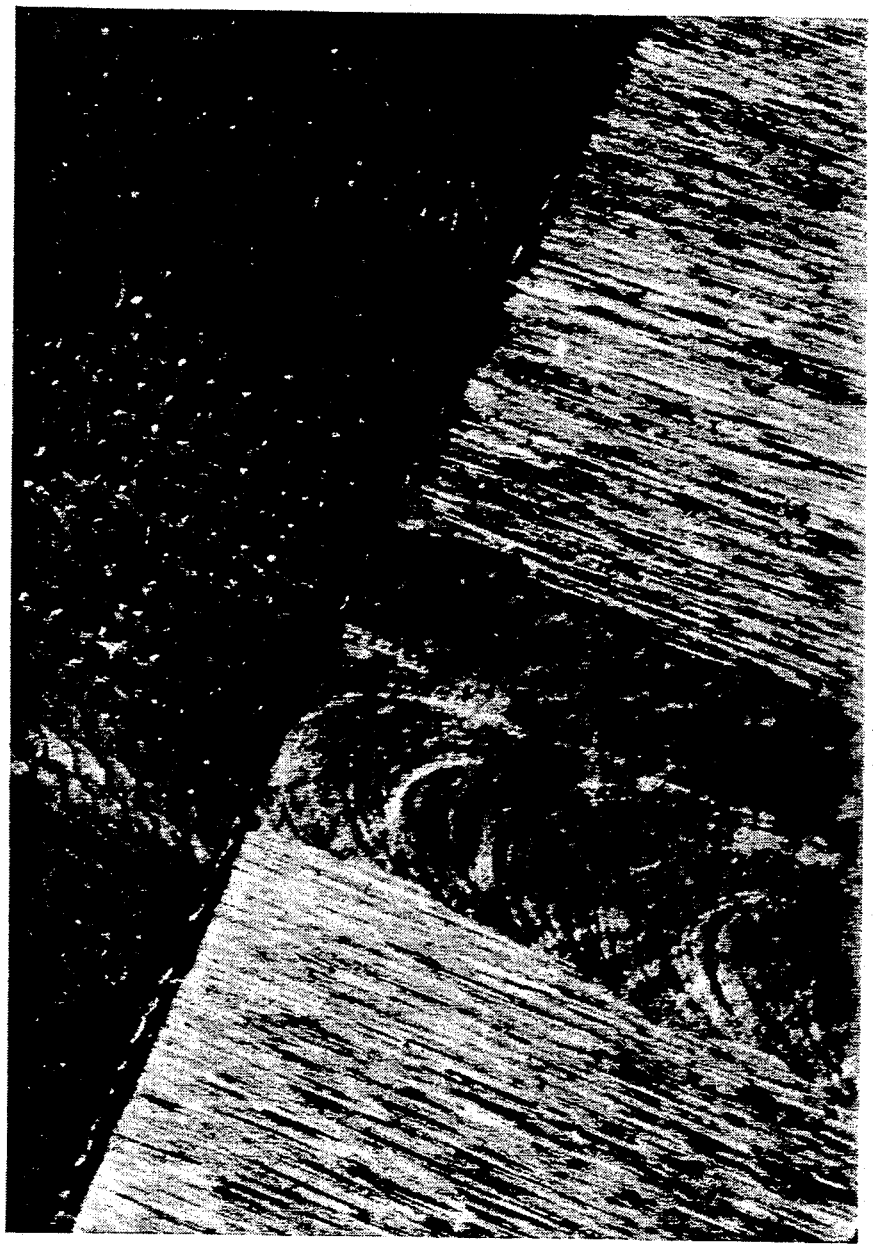
FIG. 4 is a photographic illustration of a close up (10×) of the surface treatment of the destructively ground but welded zone of the substrate.

With respect to FIG. 4, this illustrates a close up of the surface treatment of the destructively ground welded zone. Again, as with FIG. 3, the surface treatment through the use of the pulse laser substantially prevents the creation of IGSCC. Independent of the as-machined or ground surfaces, the IGSCC mitigation method works because carbon and chromium can go back into solid solution in the alloy matrix material adjacent to the grain boundaries.

Along with the fact that the surface treatment using the pulse laser can be performed to reasonable depths at reasonable speeds, the use of a pulse laser for surface mitigating has several advantages when compared to a continuous laser. First, since pulsed laser heats the material impulsively, the time at the temperature of the heated zone is much less than that for a continuous laser. This is true because with a continuous laser, a steady temperature pattern must be established around a relatively slowly moving heat source. Second, since the peak energy or power density is much higher for a pulse laser than that of a continuous laser, surface breakdown and associated high efficiency energy absorption are initiated much faster by a pulsed laser. Therefore, net power of a pulsed laser is less than that for a continuous laser doing the same job. Third, the wavelengths of neodymium lasers (glass or YAG (yttrium-aluminum-garnet)) are such that no special surface treatment is necessary prior to its use in surface desensitization. This is not the case for a continuous wave $CO_2$ laser. Fourth, the 1.06 micrometer wavelength of a neodymium laser can readily be transmitted through a single core quartz fiber optic. This is not the case for $CO_2$ lasers at a 10.6 micrometer wavelength. With the use of fiber optics, laser energy can be easily delivered to the inside diameter of a pipe of almost any size. This would include access to the inside of pipes that are being welded in place during the building of a reactor. Fifth, where high pulse rates are needed, additional pulsed lasers can be added to the optical system and synchronized to the first laser so as to multiply the pulse rate. Due to coherence effects, it is very difficult to cascade continuous wave lasers. Finally, from a practical standpoint, a pulsed laser mitigating system requires no exotic temperature feedback control as does a continuous system because beam traverse can be synchronized to the laser pulse and programmed to move step-wise with the desired feed per step.

Once given the above disclosure, many other features, modification or improvements will become apparent to the skilled artisan. Such features, modifications or improvements are, therefore, considered to be a part of this invention, the scope of which is to be determined by the following claims.

What is claimed is:

1. A method for preventing intergranular stress corrosion cracking in a substrate employing an apparatus comprising a pulsed laser, comprising the steps of:
   holding said substrate;
   surface treating a predetermined portion of said substrate with a pulsed laser beam from said pulsed laser to substantially prevent the formation of intergranular stress corrosion cracking wherein said step of operating said pulsed laser is further comprised of the step of:
   operating said laser at approximately 50 joules/pulse: and
   pulsing said laser for a pulse time of approximately 10 ms; and
   surface treating said predetermined portion of said substrate for approximately 150 ms; and
   recasting said predetermined portion of said substrate for approximately 30 ms such that substantially all carbides located within said substrate are redissolved into the recast material and cannot be easily dissolved out of the recast material thereby substantially preventing stress corrosion cracking
   repeating, if necessary, said surface treatment step until a predetermined amount of said substrate has been surface treated.

2. The method of claim 1, wherein said substrate is further comprised of:
   304 Stainless Steel.

3. The method of claim 1, wherein said pulsed laser beam is created by:
   a 1.06 micrometer wavelength neodymium pulsed laser.

4. The method of claim 1, wherein said predetermined portion of said substrate is approximately 50 mils in diameter by up to 60 mils deep.

5. The method, as in claim 1, wherein said surface treating step is further comprised of the step of:
   sensitizing said substrate for at least 10 ms.

* * * * *